Aug. 12, 1941.   G. W. KOHLMEYER   2,252,078
VENTING DEVICE FOR WATER CLOSET VALVE MECHANISMS
Filed Nov. 17, 1939   2 Sheets-Sheet 1

INVENTOR
George W. Kohlmeyer
BY
ATTORNEYS

Aug. 12, 1941.  G. W. KOHLMEYER  2,252,078
VENTING DEVICE FOR WATER CLOSET VALVE MECHANISMS
Filed Nov. 17, 1939  2 Sheets-Sheet 2

INVENTOR
George W. Kohlmeyer
BY
ATTORNEYS

Patented Aug. 12, 1941

2,252,078

UNITED STATES PATENT OFFICE 2,252,078

VENTING DEVICE FOR WATER CLOSET VALVE MECHANISMS

George W. Kohlmeyer, Buffalo, N. Y., assignor to W. A. Case and Son Manufacturing Company, Buffalo, N. Y., a corporation of New York Application November 17, 1939, Serial No. 304,987

2 Claims. (Cl. 137—69)

This invention relates to a venting device for use in connection with the valve mechanism whereby the supply of water is controlled to the storage tank of a water closet, lavatory, urinal or other plumbing fixture.

Present sanitary regulations governing the installation of plumbing fixtures or devices connected to a safe water supply require such fixtures or devices to be protected against any possible contamination of the safe water supply. Therefore such fixtures or devices must be equipped so that possible contamination of the safe water supply under vacuum or less than atmosphere pressure conditions is not possible.

It has been determined by actual experience and tests that the contaminated water in plumbing fixtures and devices connected to a safe water supply and not so protected can be drawn backwardly into the uncontaminated water supply line by means of vacuum or less than atmospheric pressure in said supply lines.

One of the several conditions which frequently exists and which would cause a backward pull through less than atmospheric conditions on the supply lines, is the draining of the water lines in a home or building when repairs are to be made on any part of the plumbing installation. This condition can be and is frequently caused through insufficient water pressure to supply the demand required by the number of fixtures installed and used. This condition can also be caused by the bursting of a water main or by supply of water to the building being reduced to a vacuum on the supply pipe lines because of fire engines pumping from mains supplying said home or building. This is particularly liable to occur in the installation of water closets having tanks in which water is stored for use in flushing the bowl, and in which the water after passing from the supply line through an automatic float controlled valve is discharged into the tank below the water level therein through a hush tube in order to render the discharge of water into the tank silent.

With a view to overcoming water contamination of this character venting means have been employed in connection with the valve mechanism which controlled the delivery of water from the supply line into the tank of the water closet or the plumbing fixture whereby communication was established between the closure of this valve mechanism and the hush tube above the water level in the storage receiving tank or fixture, thereby preventing any backward suction which might occur through vacuum conditions in the supply line.

These prior devices, however, were unsatisfactory because they were operated mechanically and liable to get out of order easily, and for the further reason that they did not close the vent perfectly in order to avoid spillage of water when filling the tank and failed to open the vent promptly when the tank was filled, and also were objectionable on account of their noisy operation.

The objects of this invention are to provide a venting means for the valve mechanism of water closet tanks or other plumbing fixtures which avoid the use of mechanically operated parts and are quiet in their operation, which provides a maximum atmospheric vent after the tank has been filled with water and also avoids spillage of water during the filling operation, which utilizes a floating valve ball as a closure adapted to seat properly under all conditions regardless of water pressure, which provides means whereby said ball cannot be drawn against the discharge opening of the water valve and thus assures a full air passage when this fixture is under vacuum condition, which embodies means for removably supporting an elastic rubber washer as a seat for the valve ball, which seat can be readily renewed when worn, which provides a hush tube and manner of combining the same with the water control valve that turbulent action of the water under high pressure is reduced to a minimum, and to ensure seating of the ball under all pressures in order to eliminate noise or reduce the same to a minimum during filling operations.

In the accompanying drawings.

In the following description similar reference characters indicate like parts in the several figures of the drawings.

Figure 1:
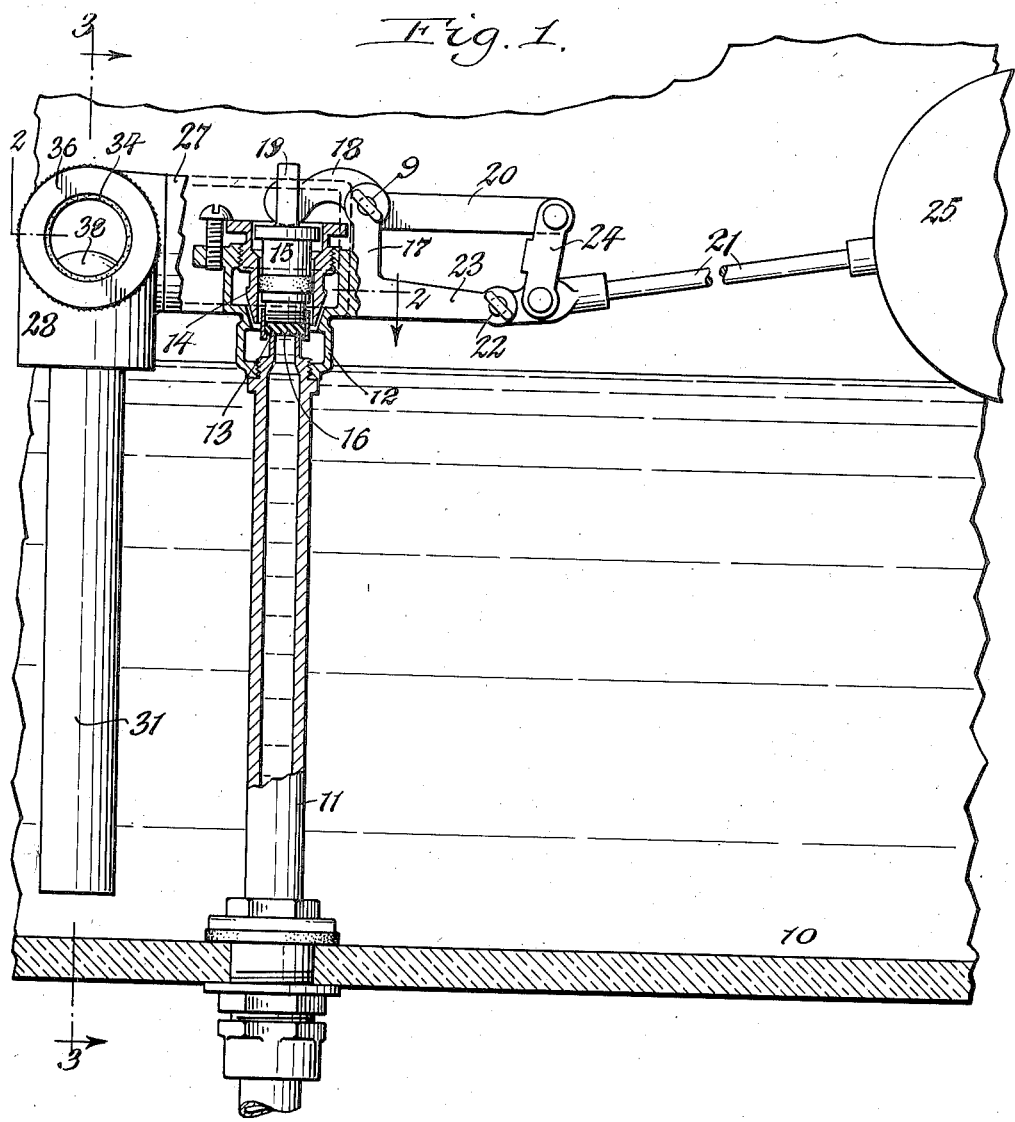
Fig. 1 is a fragmentary vertical section of a water closet tank equipped with this improved venting device.
Figure 2:
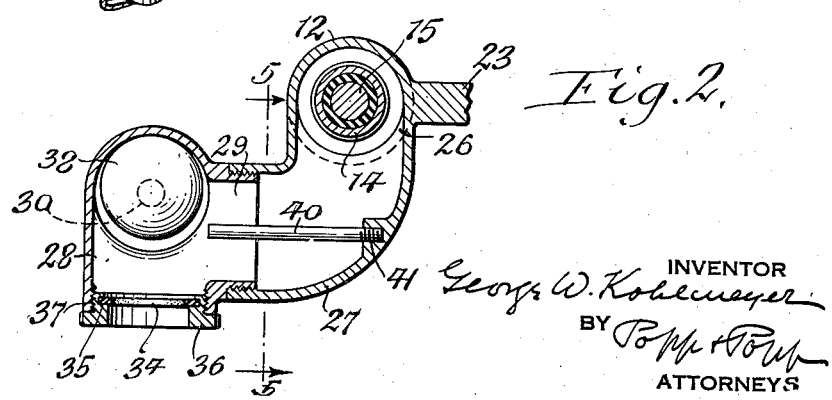
Fig. 2 is a horizontal section of the same, taken on line 2—2, Fig. 1.

The numeral 10 represents the tank of a water closet which is adapted to receive water and store the same for use in flushing the bowl of the water closet. The water is supplied to this tank under pressure from any suitable source by a water supply pipe 11 which passes upwardly through the bottom of the tank and terminates at its upper outlet end in the tank above the normal water level therein. At its outlet the water supply pipe is provided with a control valve or ball cock mechanism which may be of any suitable construction, that shown in the drawings, as an example, being as follows:

The numeral 12 represents a tubular valve case mounted on the upper end of the water supply pipe 11 and surrounding an upwardly facing valve seat 13 on the upper end of the water supply pipe. Within its upper part the valve case is provided with a tubular guide 14 in which a plunger 15 slides vertically for moving a valve closure or disk 16 on the lower end of the plunger toward and from the valve seat 13 for shutting or opening the water supply pipe.

Various means may be employed for raising and lowering the valve plunger 15 in response to the lowering and raising of the water level in the tank, those shown in the drawings comprising an operating lever pivoted by a pin 9 on a bracket 17 projecting upwardly from the valve casing and having an inner arm 18 engaging with a loop 19 on the upper end of the valve plunger and also having an outer arm 20 projecting laterally from the valve casing, and a float lever 21 pivoted by a pin 22 on a bracket 23 projecting horizontally from the valve casing and connected near said pivot by a link 24 with the outer arm 20 of the operating lever and provided at its outer end with a float 25 which preferably has the form of a hollow buoyant ball and which is adapted to rest on the surface of the water and rise and fall in accordance with the change in the water level in the tank. As the outlet or flushing valve of the tank (not shown in the drawings) is opened the water flows from the tank through this outlet to the bowl of the closet for flushing the same, and at this time the float 25 descends with the level of the water and the water inlet valve closure is opened and permits water to flow from the supply pipe into the tank, and when the water in the tank has reached its normal level the float rising therewith again moves the closure 16 against its seat 13 and shuts off the further entrance of water into the tank.

After the water enters the valve case 12 through its inlet which is surrounded by the valve seat 13 it is conducted from the outlet 26 of this case into the tank adjacent to the bottom thereof so that the incoming water will be discharged below the level of the water in the tank and thereby avoid noise. This is accomplished by a discharge conduit which comprises an elbow-shaped nozzle 27 arranged horizontally or otherwise and connected with the valve case 12 so as to practically form a continuation of its outlet 26, a vertically arranged venting chamber 28 of elbow-shape having a water inlet 29 on one of its sides which is connected with the outlet end of the nozzle 27 and also provided on its lower side with a water outlet 30, and an upright hush tube 31 connected at its upper end with the body of the vent chamber 28 so as to form a continuation of its outlet 30 and terminating at its lower end adjacent to the bottom of the closet tank.

In the preferred construction the water outlet 30 at the lower end of the venting chamber is comparatively small and formed in a nozzle 32 projecting downwardly from this chamber and the internal diameter of the hush tube is greater than the diameter of the water outlet 30, whereby the water issuing from this outlet at a relatively high speed will enter the hush tube at a materially reduced speed and thus reduce the turbulent action of the water, particularly under high pressure, and thus reduce, if not wholly eliminate, the noise which otherwise would occur. The connection between the hush tube and the venting chamber is preferably effected by a screw joint 33 between the exterior of the nozzle 32 and the upper end of the bore of the hush tube.

On that side of the venting chamber at right angles to its water inlet 29 the same is provided with automatic float controlled venting means whereby the interior of the venting chamber is closed to the outer atmosphere while water is being discharged from the supply line through the discharge line of which the hush tube forms a part and into the tank, but when the inflow of water is arrested upon reaching the predetermined level in the tank, then the venting chamber is placed in communication with the outer atmosphere. In their preferred construction these venting means are as follows:

The numeral 34 represents an annular gasket or ring which is made of rubber or other suitable resilient material and the inner edge of which forms a vent valve seat. The valve ring may be variously mounted on the venting chamber but as it is preferable to render the same removable, for this purpose the ring has its outer edge secured in an annular groove 35 formed in the bore of a bushing 36 which is secured by a screw joint 37 in the vent opening of the venting chamber. By this means the buoyant valve ball 38 and the valve seat ring 34 can be easily cleaned and also renewed when worn without necessitating dismantling of any other parts of the valve mechanism for this purpose.

Within the chamber is arranged a vent valve closure 38 which preferably has the form of a ball made of any suitable buoyant, non-corrodible material which will float in water. This ball-shaped vent closure is adapted to be moved upwardly and outwardly and into engagement with the seat on the ring 35 by the water entering the vent chamber and thus close this vent opening, as shown in Fig. 4, when water fills the upper part of the venting chamber, but when the level of the water in the venting chamber drops so the same is below the vent opening, then the ball moves away from the vent seat ring and places the interior of the venting chamber in communication with the outer atmosphere, as shown in Fig. 3.

Figure 3:
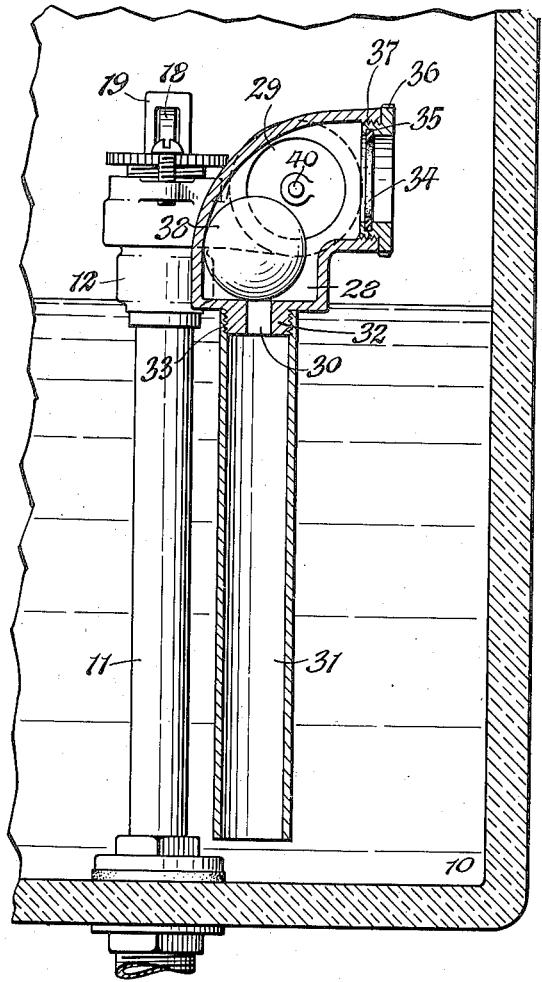
Fig. 3 is a vertical section, taken on line 3—3, Fig. 1.
Figure 5:
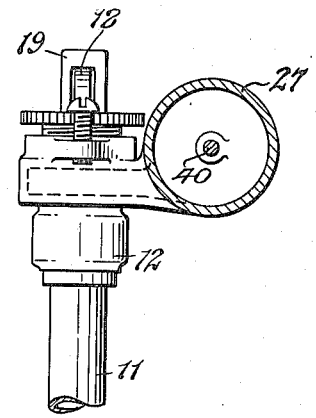
Fig. 5 is a fragmentary vertical section, taken on line 5—5, Fig. 2.
Figure 4:
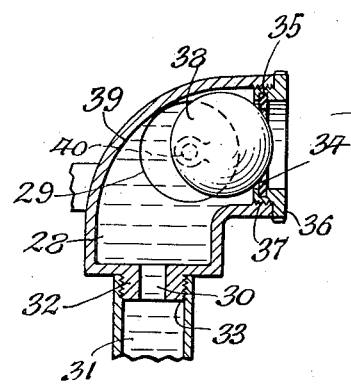
Fig. 4 is a fragmentary view similar to Fig. 3 but showing the valve ball in a closed position.

In the preferred construction the internal surface of the venting chamber is so shaped that the vent ball valve 38 upon being raised by water in the venting chamber will be automatically guided toward the seat of the ring 34, this being best accomplished by curving the internal surface of the venting chamber upwardly and lengthwise from the lower part thereof opposite the valve ring 34 to the upper part of the venting chamber of the valve ring, as shown at 39 in Figs. 3 and 4. By this means the valve ball 38 is raised the instant water from the supply line enters the venting chamber and is guided by the curved surface 39 toward the valve ring and then firmly engaged with the latter, as shown in Fig. 4, before the water completely fills the venting chamber, thereby insuring passing of all the water from the supply line through the hush tube into the tank and avoiding the production of noise, instead of permitting some of the water to pass from the venting chamber through the venting opening into the tank, which would produce an objectionable noise resulting from the spillage or dribbling of the water through the vent opening under such conditions. The instant the supply of water to the tank is cut off by the operation of the ball cock or float controlled valve closure 16, which preferably occurs when the water level in the tank is below the inlet of the valve case 12 and below the vent opening of the venting chamber, the vent ball valve 38 descends by gravity to the water level and thereby uncovers the vent opening. If the water discharge or flushing valve should be opened for flushing the closet bowl with which the tank is connected and the water inlet valve 16 is opened due to lowering of the ball float 25, and at the same time a water discharging fixture in a lower part of the building should be opened, a backward suction would occur in the pipe 11 which ordinarily supplies water to the upper tank. When this occurs the backward suction or vacuum produced in the water supply pipe 11 will not lift any water out of the hush tube or the tank connected with this tube because the vacuum in the venting chamber at the upper end of the hush tube is broken due to the vent ball valve being in its lowered position and out of engagement with the seat on the vent valve ring 34. As a result external atmospheric air is drawn backwardly through the vent opening of the venting chamber instead of drawing water backwardly from this tank whereby contamination of the water delivered by the fixtures on a lower part of the building is avoided.

Inasmuch as the ball vent valve is not operated by any working mechanism but is operated solely by the rising and falling of the water in the venting chamber, this vent valve ball acts quickly in response to variations in the water level in the venting chamber, thereby providing the fixture at all times with an adequate atmospheric vent to relieve and prevent any vacuum conditions in the supply line which carries water to the fixture containing the contaminated water.

Means are provided for preventing the vent valve ball from obstructing the water outlet nozzle of the valve case 12 during a backward suction in the supply pipe line. This is accomplished by a baffle or stop pin 40 which is arranged in the outlet of the nozzle 27 and secured at its rear end by a screw joint 41, or otherwise to the adjacent part of this nozzle, while the front end of this pin is arranged in the path of the ball valve 38 and prevents the latter from seating on the adjacent edge portions of the water inlet nozzle 29 of the venting chamber, thereby permitting air to pass freely backward from the vent opening through the venting chamber and into the water supply line whenever any backward suction occurs therein and thus providing a full backward air passage under vacuum condition and positively preventing contamination of water supply lines.

As a whole this venting device for the valve mechanism of water closets is very simple and inexpensive in construction, the same is durable and not liable to get out of order and the same operates efficiently to prevent contamination of the water and eliminate noise while operating the closet.

I claim as my invention:

1. A vent valve comprising a valve body having a venting chamber provided with a water outlet in its bottom, a water inlet in one part of its side, a vent opening in another part of its side, and a guide surface arranged internally at the top of said chamber and inclining from the upper part of said vent opening downwardly to the opposite side of said chamber, an inwardly facing valve seat arranged in said vent opening, and a spherical buoyant valve member arranged in said venting chamber and adapted to be raised by water in the venting chamber and to be deflected laterally by said guide surface into engagement with said valve seat.

2. A vent valve comprising a valve body having a venting chamber provided with a water outlet in its bottom, a water inlet in one part of its side, a vent opening in another part of its side, and a guide surface arranged internally at the top of said chamber and inclining from the upper part of said vent opening downwardly to the opposite side of said chamber, an inwardly facing valve seat arranged in said vent opening, a spherical buoyant valve member arranged in said venting chamber and adapted to be raised by water in the venting chamber and to be deflected laterally by said guide surface into engagement with said valve seat, and a horizontal stop pin arranged in said water inlet and secured at its outer end to said body and adapted to be engaged at its inner end by said valve member for preventing the latter from obstructing said water inlet.

GEORGE W. KOHLMEYER.